(12) United States Patent
Kidorf

(10) Patent No.: US 6,486,466 B1
(45) Date of Patent: *Nov. 26, 2002

(54) WIDE BANDWIDTH RAMAN AMPLIFIER HAVING A SUBSTANTIALLY FLAT GAIN PROFILE

(75) Inventor: Howard Kidorf, Red Bank, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/301,436

(22) Filed: Apr. 28, 1999

(51) Int. Cl.[7] .............................. G01B 9/10; H01S 3/00
(52) U.S. Cl. .................................. 250/227.23; 359/345
(58) Field of Search ........................ 250/227.18, 227.23, 250/227.24, 227.11; 359/345

(56) References Cited

U.S. PATENT DOCUMENTS

| | | | | |
|---|---|---|---|---|
| 4,616,898 A | * | 10/1986 | Hicks, Jr. ................. | 350/96.15 |
| 5,920,423 A | * | 7/1999 | Grubb et al. ................ | 359/341 |
| 5,959,750 A | * | 9/1999 | Eskildsen et al. ........... | 359/134 |
| 5,982,791 A | * | 11/1999 | Sorin et al. ................. | 359/247 |
| 6,052,219 A | * | 4/2000 | Kidorf et al. ............... | 359/345 |

OTHER PUBLICATIONS

Emori et al: "Broadband Lossless DCF Using Raman ADmplification Pumped By Multichannel WDM Laser iodes", Electronics Letters, Oct. 29, 1998, IEE, UK, vol. 34, No. 22, pp. 2145–2146.

Chernikov S. V. et al: "Broadband Silica Fibre Raman Amplfiers at 1.3 mu m and 1.5 mu m", 24th European Conference On Optical Communication.ECOC '98, (IEEE Cat. No. 98th 8398), Proceedings of ECOC '98—24th European Conference On Optical Communication, Madrid, Spain, Sep. 20–24, 1998, pp. 49–50, vol. 1.

Rottwitt K. et al.: "Distribution Raman amplifiers For Long Haul Transmission Systems", Conference Proceedings, LEOS '98, 11th Annual Meeting, IEEELasers And Electro–Optics Society 1998 Annual Meeting (CAT. No. 98CH36243), pp. 251–252, vol. 2, 1998, Piscataway, NJ.

* cited by examiner

Primary Examiner—Zandra V. Smith

(57) ABSTRACT

A Raman amplifier is provided that includes at least a portion of optical fiber in which an optical signal travels. The optical fiber portion may encompass all or part of the optical transmission path of an optical communication system. A pump energy unit is provided that includes at least three pump sources providing pump power at different pump wavelengths. The different pump wavelengths are spaced apart from one another by nonuniform amounts so that a prescribed Raman gain profile is generated in the optical fiber portion. An optical coupler is provided for coupling the pump power to the optical fiber portion and transmitting the optical signal therethrough.

18 Claims, 4 Drawing Sheets

- 8 100mW PUMPS
- Δλ = 12nm
- 100 0.5mW SIGNALS

WIDE BANDWIDTH RAMAN AMPLIFIER HAVING A SUBSTANTIALLY FLAT GAIN PROFILE

FIELD OF THE INVENTION

The present invention relates generally to optical amplifiers, and more particularly to a Raman amplifier having a relatively wide gain profile that is also substantially flat over the bandwidth of the optical signal being amplified therein.

BACKGROUND OF THE INVENTION

Broad bandwidth optical transmission systems have received a great deal of attention in recent years. Such systems require broad bandwidth optical amplifiers to achieve transmission of high capacity wavelength division multiplexed signals. A type of optical amplifier that is sometimes employed is a so-called distributed amplifier in which signal amplification occurs along the signal transmission path. An example of a distributed amplifier is a Raman amplifier.

Raman amplification is accomplished by introducing the signal and pump energies along the same optical fiber. The pump and signal may be copropagating or counterpropagating with respect to one another. A Raman amplifier uses stimulated Raman scattering, which occurs in silica fibers when an intense pump beam propagates through it. Stimulated Raman scattering is an inelastic scattering process in which an incident pump photon loses its energy to create another photon of reduced energy at a lower frequency. The remaining energy is absorbed by the fiber medium in the form of molecular vibrations (i.e., optical phonons). That is, pump energy of a given wavelength amplifies a signal at a longer wavelength. The relationship between the pump energy and the Raman gain for a silica fiber is shown in FIG. 1. The particular wavelength of the pump energy that is used in this example is denoted by reference numeral 1. As shown, the gain spectrum 2 for this particular pump wavelength is shifted in wavelength with respect to the pump wavelength. As FIG. 1 indicates, the bandwidth of the Raman amplifier is limited. For example, the bandwidth of the amplifier shown in FIG. 1 is only about 20 nm at a gain of 10 dB.

U.S. Appl. Ser. No. [Kidorf 7-5] discloses a Raman amplifier that has an increased bandwidth. This result is accomplished by providing two pump sources providing pump energy at two or more different wavelengths. As shown in FIG. 2, pump energy supplied at a wavelength denoted by reference numeral 40 generates gain curve 42 while pump energy supplied at a wavelength denoted by reference numeral 41 generates gain curve 43. The composite gain spectrum, indicated by curve 44, has a bandwidth that is greater than either of the individual gain curves 42 and 43.

It is generally desirable to provide a gain spectrum that is reasonably flat over all or a substantial portion of the amplifier's bandwidth. Unfortunately, if multiple pumps are used in the manner described in the previously mentioned patent, a flat gain spectrum will not necessarily arise. For example, if multiple pumps are employed that all generate the same pump power but at different wavelengths that are evenly spaced from one another, an asymmetric gain curve is produced in which more gain is generated at higher wavelengths than lower wavelengths. This occurs because the pump sources operating at lower wavelengths effectively pump the pump sources operating at higher wavelengths.

Accordingly it would be desirable to provide a wide-bandwidth Raman amplifier employing multiple pump sources in which the resulting gain spectrum is flat to within some specified tolerance over the amplifier's bandwidth.

SUMMARY OF THE INVENTION

In accordance with the present invention, a Raman amplifier is provided that includes at least a portion of optical fiber in which an optical signal travels. The optical fiber portion may encompass all or part of the optical transmission path of an optical communication system. A pump energy unit is provided that includes at least three pump sources providing pump power at different pump wavelengths. The different pump wavelengths are spaced apart from one another by nonuniform amounts so that a prescribed Raman gain profile is generated in the optical fiber portion. An optical coupler is provided for coupling the pump power to the optical fiber portion and transmitting the optical signal therethrough.

In accordance with another aspect of the invention, the gain profile of the amplifier is substantially flat within a predetermined threshold over the bandwidth of the optical signal. Such a profile may be achieved by arranging the nonuniform pump wavelength distribution so that the spacing between pump wavelengths decreases for decreasing pump wavelengths. Moreover, the coupler coupling the pump power to the optical fiber portion may be a wavelength division multiplexed coupler, or, alternatively, an optical circulator. The pump energy unit may also include an optical coupler for combining the different pump wavelengths prior to being directed to the optical fiber portion in which the signal travels.

In accordance with yet another aspect of the invention, a method is provided for generating a prescribed Raman gain profile in at least a portion of optical fiber that serves as a gain medium and in which an optical signal travels. Pump power is provided at least three different pump wavelengths. The different pump wavelengths are selected so that they are spaced apart from one another by nonuniform amounts so that Raman gain generated in the optical fiber portion has a prescribed profile. The pump power is coupled to the optical fiber portion.

DETAILED DESCRIPTION

Figure 1:
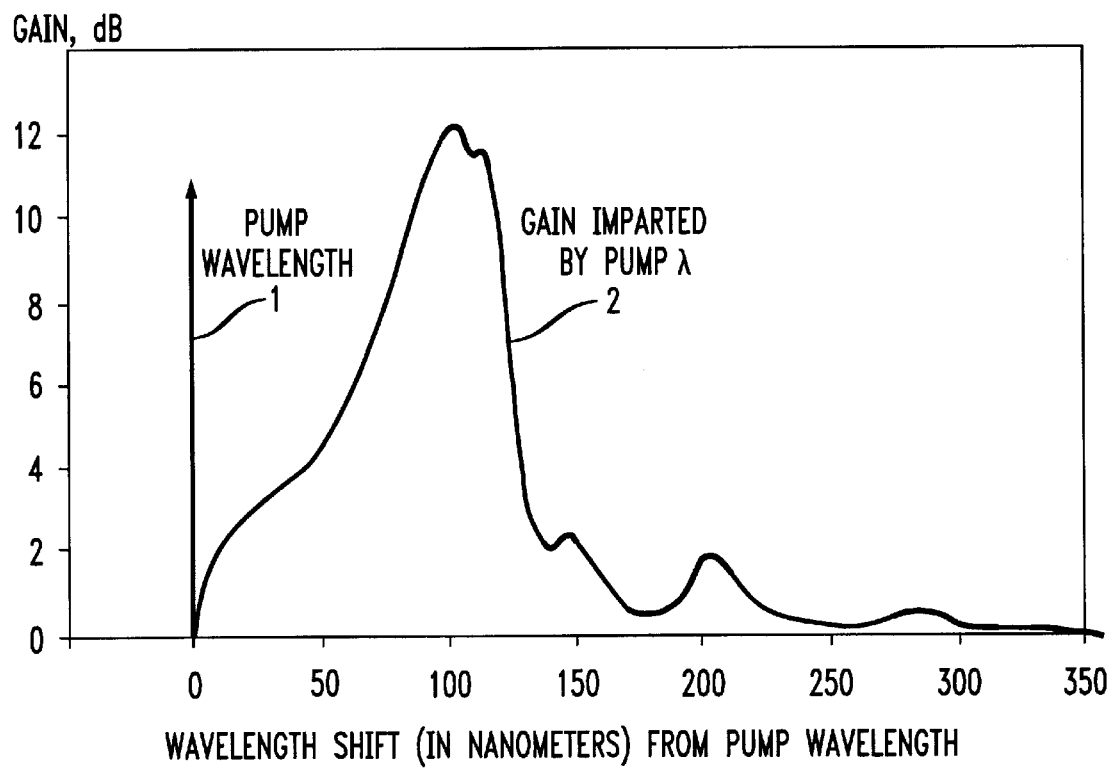
FIG. 1 shows the relationship between pump energy and Raman gain for a silica fiber.
Figure 2:
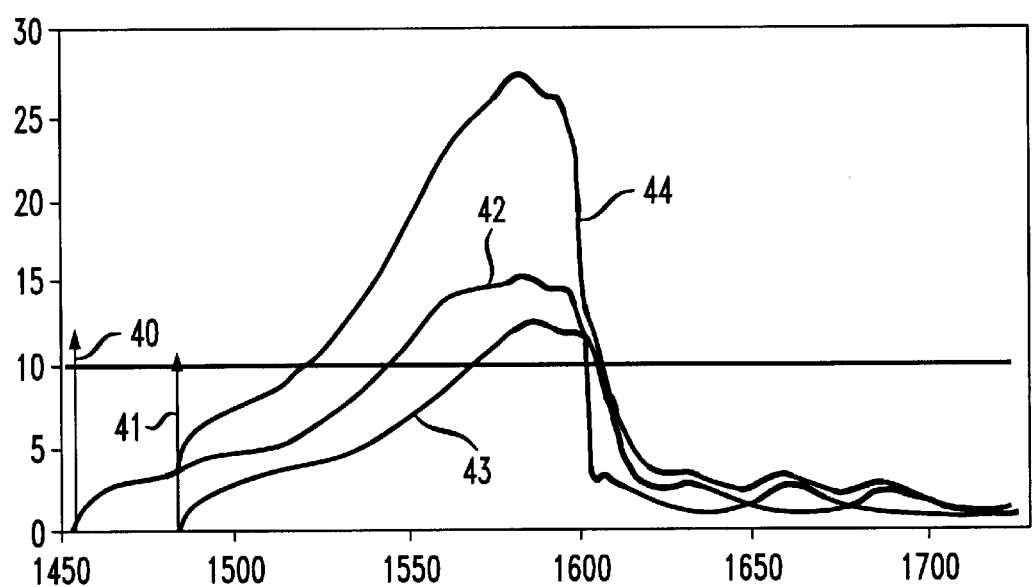
FIG. 2 shows the Raman gain provided by the Raman amplifier shown in FIG. 5.
Figure 3:
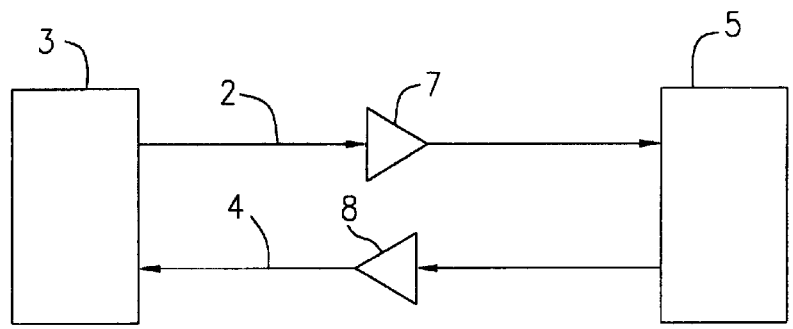
FIG. 3 shows an optical communication system that employs optical amplifiers.

Referring to FIG. 3, there is disclosed a lightwave communication system which utilizes optical fiber amplifiers such as Raman amplifiers. The system includes transmitter/receiver terminals 3 and 5 and optical transmission fiber paths 2 and 4 supporting bidirectional communication. The signals being transmitted from the terminals 3 and 5 are in optical form. There is no intermediate conversion to electrical form. A plurality of optical amplifiers 7 and 8 are interposed in the fiber paths 2 and 4 between the transmitter/receiver terminals 3 and 5. Optical amplifiers 7 and 8 contain a length of fiber that provides a gain medium, an energy source that pumps the fiber to provide gain, and a means of coupling the pump energy into the fiber without interfering with the signal being amplified. In the case of Raman amplifiers, the fiber providing the gain medium is the transmission path itself. These components of the optical amplifiers are shown in greater detail in FIG. 4. While only one pair of optical amplifiers is depicted in FIG. 3 for clarity of discussion, it should be understood by those skilled in the art that the present invention finds application in transmission paths of all lengths having many additional pairs of optical amplifiers.

Figure 4:
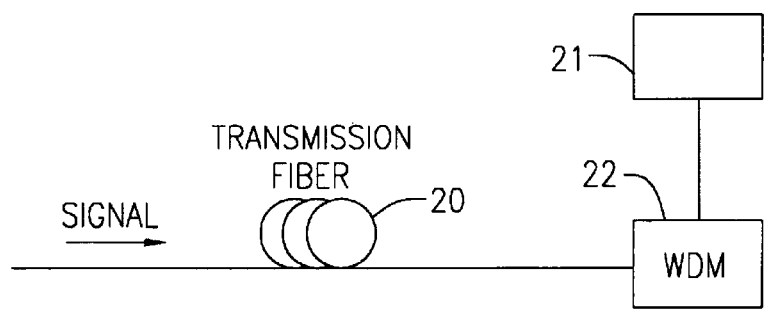
FIG. 4 shows the pertinent details of a known Raman amplifier.

Referring to FIG. 4, each distributed optical amplifier includes an optical fiber portion 20 of the transmission path in which Raman gain is to be generated. This portion 20 of fiber may vary in size and may be limited, for example, to a small section of the transmission path. Alternatively, the fiber portion 20 in which Raman gain is generated may have a length encompassing the entire transmission path. The fiber portion 20 is coupled to a source of optical pump energy 21 via a coupler 22 such as a wavelength division multiplexer (WDM).

Figure 5:
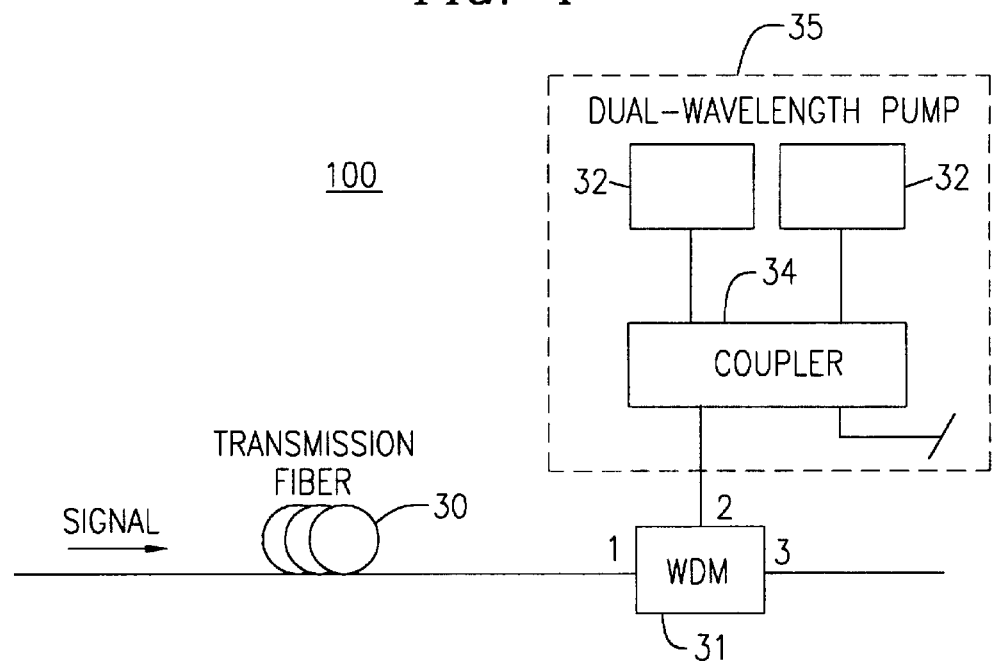
FIG. 5 shows another example of a Raman amplifier

FIG. 5 shows a Raman amplifier 100 of the type disclosed in U.S. application Ser. No. 09/030,994. Pairs of Raman amplifiers 100 may be used in a transmission system such as shown in FIG. 3. Similar to FIG. 4, the Raman amplifier 100 includes optical fiber portion 30 in which Raman gain is generated and an optical pump unit 35 coupled to the fiber portion 30 by an optical coupler 31. The exemplary pump unit 35 includes eight optical pump sources shown generally at 32. An optical coupler 34 combines the energy from pump sources 32 and directs the resulting beam to WDM coupler 31. As previously explained, the pump sources 32 generate pump energy at different wavelengths selected to maximize the amplifier bandwidth.

Figure 6:
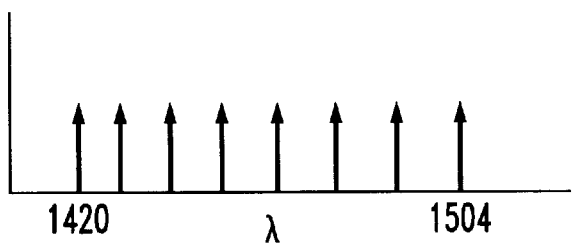
FIG. 6 shows a series of pump energies that are employed by a Raman amplifier, which are evenly spaced in wavelength from one another.

FIG. 6 shows an example of the spectral distribution of pump energies that may be employed by pump unit 35. As shown, the eight pumps encompass a wavelength range between 1420 and 1504 nm and are evenly spaced 12 nm apart from one another. The pump power of each pump source is illustratively chosen to be 100 mw. Raman amplifier 100 may amplify a WDM signal ranging from 1520–1619 nm.

Figure 7:
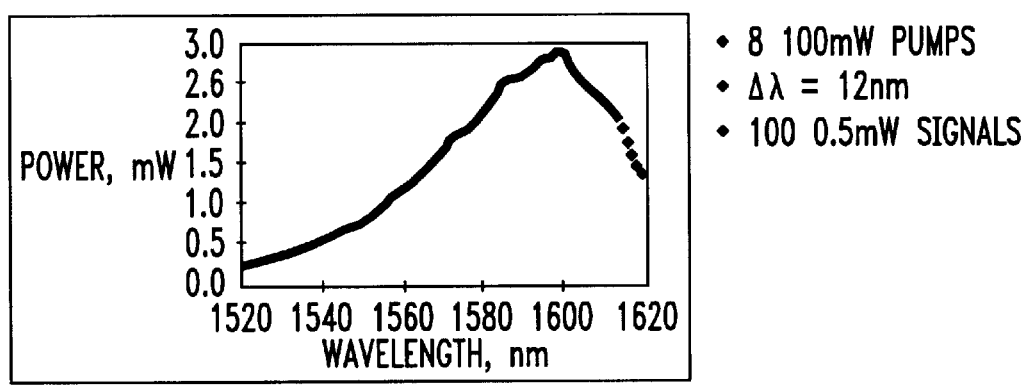
FIG. 7 shows the normalized gain curve produced by a Raman amplifier with the spectral distribution of pump energies shown in FIG. 6.

FIG. 7 shows the normalized gain curve produced by the amplifier 100 with the spectral distribution of pump energies shown in FIG. 6. Clearly, the gain is unequal over the bandwidth of the signal, with far greater gain being imparted at higher wavelengths. This asymmetry arises because the lower pump wavelengths pump the higher pump wavelengths, thus depleting the lower pump wavelengths.

Figure 8:
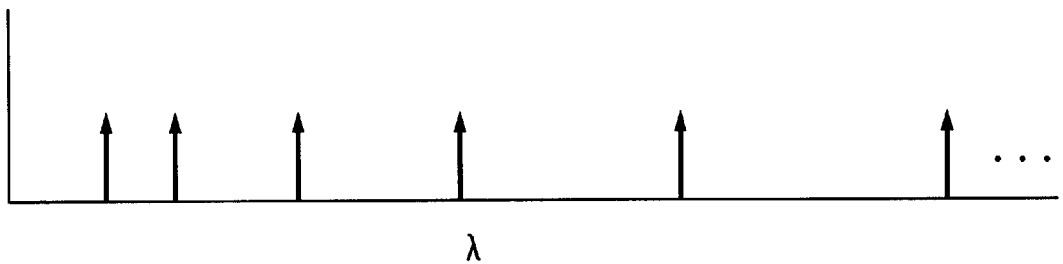
FIG. 8 shows an example of a nonuniform distribution of pump wavelengths that may be employed by a Raman amplifier in accordance with the present invention.

The present inventors have recognized that the problem of unequal gain distribution may be overcome by providing pump sources at wavelengths that are spaced apart by varying amounts rather than by constant amounts. Specifically, the gain distribution may be equalized by decreasing the spacing between pump wavelengths at decreasing pump wavelengths. FIG. 8 shows an example of such a distribution for eight wavelengths in which the variation in spacing decreases in a uniform manner as the pump wavelength decreases. The resulting increase in energy density at lower wavelengths will be balanced by the transfer of energy from lower to higher pump wavelengths, which arises because the lower wavelengths pump the higher wavelengths. Of course, the spacing between pump wavelengths need not vary in a uniform manner. Rather, any unequal distribution may be employed so that gain curve is flat within a specified tolerance over the bandwidth of the signal.

More generally, the present invention contemplates the provision of gain curves that have a prescribed distribution over the bandwidth of the signal. That is, the unequal spectral distribution of pump wavelengths in accordance with the invention may be employed to generate a gain curve that is not flat, but rather varies with the signal wavelength in a prescribed manner.

Figure 9:
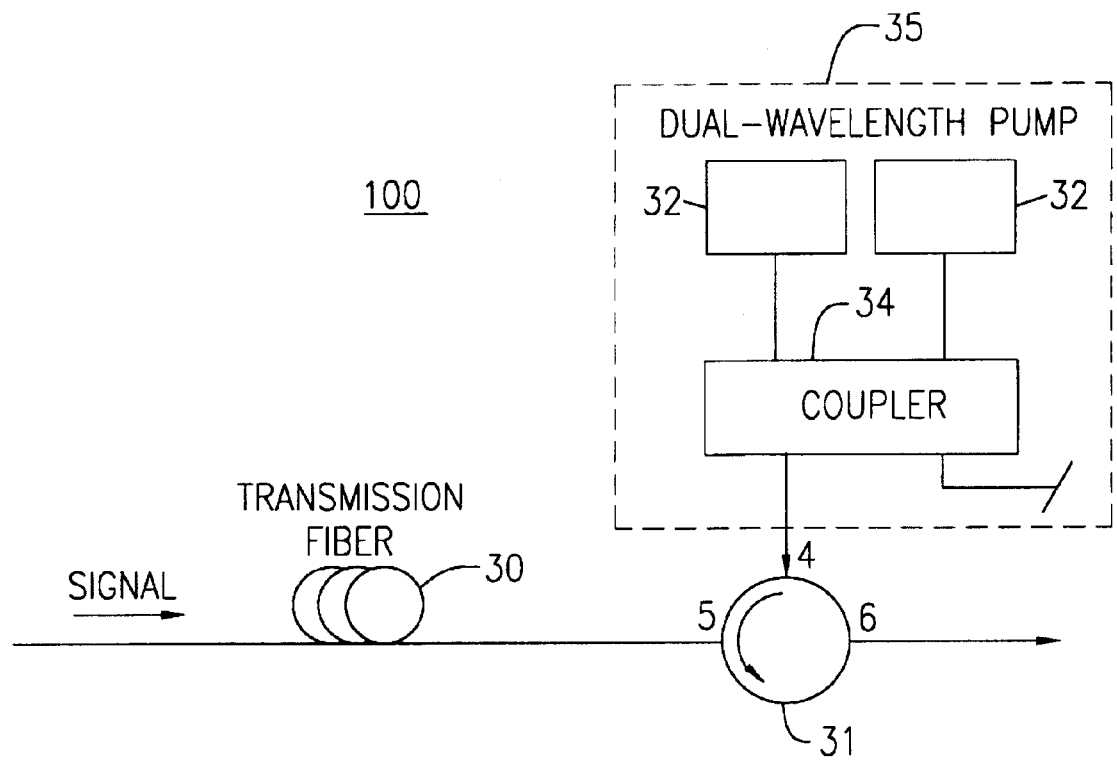
FIG. 9 shows an alternative embodiment of a Raman amplifier that may be employed in accordance with the present invention.

FIG. 9 shows an alternative embodiment of the invention in which WDM coupler 31 is replaced with a circulator. In FIGS. 5 and 9, like reference numerals denote like elements. The Raman amplifier 100 includes optical fiber portion 30 in which Raman gain is generated and an optical pump unit 35 coupled to the fiber portion 30 by a three port optical circulator 31. The circulator 31 has ports 4, 5, and 6 in which port 5 is located downstream from port 4 and port 6 is located downstream from port 5. That is, optical energy is transported through the circulator 31 in a counterclockwise direction. The exemplary pump unit 35 includes eight optical pump sources 32. An optical coupler 34 combines the energy from pump sources 32 and directs the resulting beam to port 4 of circulator 31. As previously explained, the pump sources 32 generate pump energy at pump wavelengths that are distributed in a spectrally non-uniform manner. In operation, the pump energy is supplied to the transmission fiber 30 by entering port 4 of the circulator 31 and exiting via port 5. The signal propagating along transmission fiber 30 enters port 5 of circulator 31 and exits via port 6. Accordingly, as long as the bandwidth of the circulator 31 is sufficiently wide, the circulator 31 can accommodate pump and signal wavelengths that overlap. In contrast, the design of the WDM coupler shown in FIG. 5 inherently prevents the pump and signal wavelengths from overlapping.

What has been described is merely illustrative of the application of the principles of the present invention. Other arrangements and methods can be implemented by those skilled in the art without departing from the spirit and scope of the present invention. For example, the advantages that accrue by combining optical pump sources is not limited to combining eight different wavelengths. More generally, any desirable number of pump wavelengths may be used to further tailor the resulting bandwidth of the Raman amplifier.

What is claimed is:

1. A Raman amplifier, comprising:
   at least a portion of optical fiber in which an optical signal travels for providing a gain medium;
   a pump energy unit that includes at least three pump sources providing pump power at different pump wavelengths, said different pump wavelengths being spaced apart from one another by nonuniform amounts so that a prescribed Raman gain profile is generated in the optical fiber portion; and
   an optical coupler for coupling the pump power to the optical fiber portion and transmitting the optical signal therethrough.

2. The amplifier of claim 1 wherein said gain profile is substantially flat within a predetermined threshold over the bandwidth of the optical signal.

3. The amplifier of claim 1 wherein said nonuniform pump wavelength distribution provides decreasing spacing between pump wavelengths at decreasing pump wavelengths.

4. The amplifier of claim 1 wherein said coupler is a wavelength division multiplexed coupler.

5. The amplifier of claim 1 wherein said optical coupler is an optical circulator having a first port receiving said pump power, a second port providing said pump power to said optical fiber and receiving said optical signal, and a third port transmitting said optical signal received from the second port.

6. The amplifier of claim 1 wherein said pump energy unit includes a second optical coupler for combining said different pump wavelengths.

7. An optical transmission system, comprising:
   first and second transmitter/receiver terminals remotely located with respect to one another;
   an optical transmission path coupling said first terminal to said second terminal;
   a Raman amplifier providing gain to an optical signal in at least a portion of said optical transmission path, said amplifier including;
      at least a portion of optical fiber in which an optical signal travels for providing a gain medium;
      a pump energy unit that includes at least three pump sources providing pump power at different pump wavelengths, said different pump wavelengths being spaced apart from one another by nonuniform amounts so that a prescribed Raman gain profile is generated in the optical fiber portion; and
      an optical coupler for coupling the pump power to the optical fiber portion and transmitting the optical signal therethrough.

8. The system of claim 7 wherein said gain profile is substantially flat within a predetermined threshold over the bandwidth of the optical signal.

9. The system of claim 7 wherein said nonuniform pump wavelength distribution provides decreasing spacing between pump wavelengths at decreasing pump wavelengths.

10. The system of claim 7 wherein said coupler is a wavelength division multiplexed coupler.

11. The system of claim 7 wherein said optical coupler is an optical circulator having a first port receiving said pump power, a second port providing said pump power to said optical fiber and receiving said optical signal, and a third port transmitting said optical signal received from the second port.

12. The system of claim 7 wherein said pump energy unit includes a second optical coupler for combining said different pump wavelengths.

13. A method of generating a prescribed Raman gain profile in at least a portion of optical fiber, serving as a gain medium, in which an optical signal travels;
   providing pump power at least three different pump wavelengths;
   selecting said different pump wavelengths so that they are spaced apart from one another by nonuniform amounts so that Raman gain generated in the optical fiber portion has a prescribed profile; and
   coupling said pump power to the optical fiber portion.

14. The method of claim 13 wherein said prescribed gain profile is substantially flat within a predetermined threshold over the bandwidth of the optical signal.

15. The method of claim 13 wherein said nonuniform pump wavelength distribution provides decreasing spacing between pump wavelengths at decreasing pump wavelengths.

16. The method of claim 13 wherein said coupling step is performed by a wavelength division multiplexed coupler.

17. The method of claim 13 wherein said coupling step is performed by optical circulator having a first port receiving said pump power, a second port providing said pump power to said optical fiber and receiving said optical signal, and a third port transmitting said optical signal received from the second port.

18. The method of claim 13 further comprising the step of coupling together said different pump wavelengths.

* * * * *